United States Patent
Hasler

(10) Patent No.: US 8,893,352 B2
(45) Date of Patent: Nov. 25, 2014

(54) HINGE WITH ADJUSTMENT ELEMENTS AND ADJUSTMENT CROWN FOR ADJUSTMENT ELEMENTS

(71) Applicant: Josef Hasler, Hinterforst (CH)

(72) Inventor: Josef Hasler, Hinterforst (CH)

(*) Notice: Subject to any disclaimer, the term of this patent is extended or adjusted under 35 U.S.C. 154(b) by 0 days.

(21) Appl. No.: 13/659,765

(22) Filed: Oct. 24, 2012

(65) Prior Publication Data

US 2013/0104340 A1    May 2, 2013

(30) Foreign Application Priority Data

Oct. 26, 2011  (EP) ................................. 11186607

(51) Int. Cl.
  E05D 7/04    (2006.01)
  E05D 3/02    (2006.01)
  E05D 7/00    (2006.01)
  F16B 33/00   (2006.01)

(52) U.S. Cl.
  CPC ............... *E05D 7/0027* (2013.01); *E05D 3/02* (2013.01); *E05Y 2900/132* (2013.01); *E05D 7/0054* (2013.01); *F16B 33/00* (2013.01)
  USPC ........................................................ 16/238

(58) Field of Classification Search
  USPC ............ 16/236, 238, 240, 243, 245, 299, 301
  See application file for complete search history.

(56) References Cited

U.S. PATENT DOCUMENTS

| | | | | |
|---|---|---|---|---|
| 822,911 | A * | 6/1906 | Bommer | 16/256 |
| 4,751,765 | A * | 6/1988 | Wu | 16/256 |
| 5,033,160 | A * | 7/1991 | Salice | 16/240 |
| 6,256,839 | B1 * | 7/2001 | Wu | 16/366 |
| 6,484,363 | B1 * | 11/2002 | Chung | 16/242 |
| 6,618,902 | B2 * | 9/2003 | Wu | 16/298 |
| 6,807,713 | B2 * | 10/2004 | Rock | 16/387 |
| 7,334,293 | B2 * | 2/2008 | Erickson et al. | 16/243 |
| 7,346,959 | B2 * | 3/2008 | Heid | 16/242 |
| 7,676,887 | B2 * | 3/2010 | Chung | 16/236 |
| 8,117,718 | B2 * | 2/2012 | Chien | 16/330 |

(Continued)

FOREIGN PATENT DOCUMENTS

| | | |
|---|---|---|
| DE | 3507156 | 9/1986 |
| DE | 201 17 305 U1 | 1/2002 |

(Continued)

OTHER PUBLICATIONS

WO 2010089942 A1—Machine Translation.*

(Continued)

*Primary Examiner* — Victor Batson
*Assistant Examiner* — Jason W San
(74) *Attorney, Agent, or Firm* — Maschoff Brennan

(57) ABSTRACT

Adjustable hinge for pivotably connecting two elements, said hinge comprising at least one adjustment element, which is formed as an eccentric component and is used to provide the possibility for lateral displacement of the elements against one another perpendicular to the longitudinal direction of the hinge, and an adjustment element, which is used to provide the possibility for lateral displacement of the elements against one another in the longitudinal direction of the hinge and is optionally provided with a locking mechanism. The adjustment elements and optionally the locking mechanism are provided with an adjustment crown. A component of the hinge arranged in the longitudinal direction of the hinge is connectable to one of the two elements via a curved flange. Adjustment crown for an adjustment element of a hinge.

16 Claims, 6 Drawing Sheets

(56) References Cited

U.S. PATENT DOCUMENTS

| | | | |
|---|---|---|---|
| 8,196,265 B2 * | 6/2012 | Neukoetter et al. | 16/389 |
| 8,381,355 B2 * | 2/2013 | Pacini | 16/240 |
| 2008/0034542 A1 * | 2/2008 | Lee | 16/342 |
| 2008/0104798 A1 * | 5/2008 | Hoppe et al. | 16/236 |
| 2008/0104799 A1 * | 5/2008 | Hoppe et al. | 16/238 |
| 2008/0307606 A1 * | 12/2008 | Karlsson | 16/243 |
| 2010/0313483 A1 * | 12/2010 | Waddell | 49/399 |
| 2011/0041288 A1 * | 2/2011 | Pacini | 16/244 |
| 2011/0099755 A1 * | 5/2011 | Reichel | 16/251 |
| 2012/0005859 A1 * | 1/2012 | Herglotz et al. | 16/241 |
| 2013/0104340 A1 * | 5/2013 | Hasler | 16/238 |

FOREIGN PATENT DOCUMENTS

| | | | |
|---|---|---|---|
| EP | 387207 A * | 9/1990 | |
| EP | 0893564 | 1/1999 | |
| EP | 0962 616 | 12/1999 | |
| EP | 1 445 408 A1 | 8/2004 | |
| EP | 1672155 | 6/2006 | |
| EP | 1672155 A1 * | 6/2006 | |
| EP | 2275631 A2 * | 1/2011 | |
| GB | 2156898 | 10/1985 | |
| GB | 2415013 | 12/2005 | |
| WO | WO 9841720 A1 * | 9/1998 | |
| WO | WO 2006060018 A1 * | 6/2006 | |
| WO | 2010/089942 | 8/2010 | |
| WO | WO 2010089942 A1 * | 8/2010 | |

OTHER PUBLICATIONS

European Search Report completed Jul. 24, 2012 in related European Patent Application No. EP 11186607.

Extended European Search Report completed Jul. 24, 2012 in related European Patent Application No. EP 11186607.

* cited by examiner

HINGE WITH ADJUSTMENT ELEMENTS AND ADJUSTMENT CROWN FOR ADJUSTMENT ELEMENTS

CROSS-REFERENCE TO RELATED APPLICATIONS

This application claims priority to European Patent Application No. 11186607.5, filed Oct. 26, 2011, which is incorporated herein by reference in its entirety.

FIELD OF THE INVENTION

The invention relates to an adjustable hinge and to an adjustment crown for adjustment elements for such a hinge.

BACKGROUND

Adjustable hinges are known per se. They generally allow at least a lateral displacement of the elements interconnected by the hinge in at least one direction, but usually in a plurality of directions. For example, an adjustable hinge for heavy doors is known from EP 0962616 A1, in which the possibility for lateral adjustment perpendicular to the longitudinal axis of the hinge is enabled by the use of an eccentric bush or an eccentric bolt. A possibility for adjustment in a vertical direction is enabled via a screw, which displaces the bolt horizontally in the bush. A pressure disk fabricated from self-lubricating bronze is provided between the bearing bush and the bolt so as to enable the heavy door to be easily pivoted.

Adjustment elements, such as adjustment screws, bushes, eccentric bushes, bolts and double-ended bolts, as well as respective check nuts, with which specific settings of a relatively complex component, for example including the settings of a hinge, can be set, are likewise known per se. Such adjustment elements generally have a head, which is formed as an outer hexagon or inner hexagon and can be manipulated using a tool formed accordingly in a diametrically opposed manner. In order to prevent a further, unintentional rotation of such an adjustment element and to thereby prevent a change to the setting made, locking mechanisms are provided for such adjustment elements and can be tightened/locked or released/unlocked, for example with the aid of a tool formed accordingly as an inner hexagon or outer hexagon. Such locking mechanisms may be formed for example as worm screws, fixing clamps, etc., or may be provided in the form of the check nuts already mentioned.

With the previous embodiment of the adjustment elements and of the locking mechanisms, a relatively large amount of space has to be left around the adjustment elements and the locking mechanisms for manipulation thereof during operation so as to ensure accessibility with a corresponding tool. Only in this way can a readjustment be made without having to expose or disassemble the component.

SUMMARY

The object of the present invention is therefore to provide an adjustable hinge, of which the adjustability is ensured, even in situations where space is restricted.

The embodiment of the adjustment elements and of the locking mechanisms in the previous form, which, as described, required a relatively large amount of surrounding space for the purposes of adjustability, meant that adjustable hinges could not be formed as covered hinges. This affected hinges for lightweight doors, for example for doors of kitchen cupboards or wardrobes or the like, as well as hinges for vertically pivotable window casements or horizontally tiltable windows, and hinges for heavy doors, such as for room doors, front doors, fire doors, etc.

The object of the present invention is therefore to provide an adjustable hinge that can be fitted in a covered manner.

Another object is to provide an adjustable hinge, which can be fitted in a covered manner and which reliably performs its pivoting function, even under the effects of high force and/or in critical situations.

At least one of these objects is achieved by a hinge and by structural elements for the hinge.

The adjustable hinge has a bolt and a bearing bush receiving the bolt and is used to pivotably connect a first element to a second element. It comprises adjustment elements and optionally locking mechanisms, wherein a first adjustment element is designed eccentrically and is used to provide the possibility for lateral displacement of the elements against one another perpendicular to the longitudinal direction of the hinge, and the second adjustment element is used to provide the possibility for displacement of the elements against one another in the longitudinal direction of the hinge. The adjustment elements may optionally be provided with a locking mechanism. So that the adjustment elements and optionally the locking mechanisms are also adjustable in situations where space is restricted and possibly with covered fitting, for example in a door jamb or window frame, the adjustment elements and optionally the locking mechanisms are provided with adjustment crowns. The adjustment crown is formed in a disk-like manner or similarly to a disk with a circular or polygonal periphery. A plurality of radial engagement openings are distributed over the periphery of the adjustment crown and are preferably distributed uniformly over the periphery.

It is particularly advantageous if the adjustment crown is provided with one or more markings so that the adjustment elements can be set precisely and the setting can be checked, noted and/or repeated. Such markings may be notches or colored symbols or the like. It is particularly advantageous if each engagement opening is provided with a marking, at best with a marking that identifies each engagement opening clearly, for example by means of letters or numbers.

The adjustment crowns are particularly easily adjusted if they are arranged in the hinge in such a way that their radial engagement openings are oriented perpendicular to the longitudinal direction of the hinge.

The first adjustment element may advantageously be designed as an eccentric bush or as an eccentric bolt. For the possibility of adjustment in three dimensions, both an eccentric bush and an eccentric bolt may be provided as adjustment elements.

For the possibility of adjustment in the longitudinal direction of the hinge, it is advantageous to provide a set-screw as a second adjustment element, said set-screw acting on the bolt displaceably in the longitudinal direction of the hinge. A check nut is preferably provided as a locking mechanism for the set-screw and is likewise provided with an adjustment crown.

The hinge naturally has two components that are mutually opposed in the longitudinal direction of the hinge and can be rotated against one another. In simple hinges, these are a bolt and a bearing bush receiving the bolt; in more complex hinges these are two bearing bushes, which each receive a bolt end of a double-ended bolt.

For a covered fitting of the hinge, it is advantageous if a first component of these two above-described components, which are mutually opposed and can be rotated against one another, is connectable to the first element and if a second of these two components is connectable to the second element via a free end of a curved flange or of a curved connecting arm. The curvature of the flange or connecting arm is selected such that the flange or arm is guided around the component in part.

In a particularly preferred embodiment, the curvature is selected such that the flange or arm is guided around the component in part and the free end of the flange or arm lies outside the tangent of the rotatable component, in which the flange or arm engages the second component. The axis of rotation about which the two elements are pivoted against one another can thus be shifted from the longitudinal axis of the hinge and the two elements can be pivoted, even though the longitudinal axis of the hinge lies in one of the two elements.

The element intended to receive the hinge is a recess or is provided with a recess, into which the hinge can be fitted.

If the hinge is fitted as intended, its main components, namely in particular the two components that are mutually opposed in the longitudinal direction and can rotate against one another, are placed within this recess, and only the free end of the curved flange or connecting arm protrudes from the recess. The flange or connecting arm can be pivoted out from the recess and into the recess.

The hinge further advantageously comprises a cover plate, with which the recess can be closed in such a way that the curved flange protrudes through an opening in the cover plate in the described form and is pivotable. In this case, the cover plate preferably covers, at least in part, the projection region of at least one of the two components that are mutually opposed in the longitudinal direction and can rotate against one another, the function of the flange or connecting arm still being maintained.

In an advantageous embodiment of the hinge, the cover plate is used as a stop for the pivotal movement of the flange so that said flange does not pivot out too far and/or as protection for the edge of the recess, which could be damaged by the flange if the flange were to pivot out too far. The cover plate is preferably also used to protect the hinge against moisture, heat and dirt. Depending on the embodiment, the cover plate is also used as an optical covering of the recess.

The two components that are mutually opposed in the longitudinal direction of the hinge and can rotate against one another are advantageously connectable to the elements by means of fastening plates, a fastening plate being arranged at the free end of the curved flange or of the curved connecting arm. The flange has a curvature that is selected so that, in a first closed position of the hinge, the two fastening plates lie in one plane or in two parallel planes arranged close together. In a second, maximally open position of the hinge, the two fastening plates then lie at an angle of approximately 90° to 110° to one another. If means other than fastening plates are provided in order to connect the two components mutually opposed in the longitudinal direction of the hinge to the elements, the curvature of the flange is to be selected analogously.

If the two components of the hinge that are mutually opposed in the longitudinal direction of the hinge and can be rotated against one another are two bearing bushes and if these are interconnected by means of a double-ended bolt, it is particularly advantageous if the double-ended bolt is an eccentric bolt and has a second adjustment crown between its two bolt ends. At least one of its two bolt ends is then arranged eccentrically in relation to the second adjustment crown. This is to provide the option for adjustability of the two elements relative to one another in a lateral direction perpendicular to the longitudinal direction of the hinge.

Another option lies in mounting an eccentric bush rotatably, at least in one of the two bearing bushes, said eccentric bush having a first adjustment crown. If both options are implemented in the same hinge, the possibility for adjustment in the y-direction and z-direction (with reference to a Cartesian coordinate system) is achieved.

As described above, the possibility for adjustment in the x-direction is achieved by a set-screw, which has a fourth adjustment crown and which acts on the bolt displaceably in the longitudinal direction of the hinge. A check nut, which is provided with a third adjustment crown, is preferably provided as a locking mechanism for the set-screw.

In an embodiment that is advantageous in particular for heavy doors and for safety doors, forces acting in the longitudinal direction of the hinge are conveyed between a bolt and a bearing bush via a pressure disk, the bearing bush preferably having a through-opening, via which lubricant can be introduced.

It is particularly advantageous if the pressure disk is fabricated from bronze, in particular from self-lubricating bronze.

It is likewise advantageous if the pressure disk has a channel system for the distribution of lubricant. Pressure disks that have a central through-opening and a cross-shaped groove or a tapping groove at least on one side, said groove connecting the through-opening to a circular groove and/or to a peripheral groove, have proven to be particularly suitable for use in hinges. If such pressure disks are used in a hinge of the type presented here, the through-openings in the bearing bushes are thus preferably arranged such that they are aligned with the through-opening in the pressure disk, which enables simple and efficient introduction of a lubricant.

The hinge is particularly advantageously fitted already lubricated with a permanent lubricant, for example with STRABURAGS NBU 30 PTM® (from Klueber Lubrication Zürich). A hinge lubricated in this manner generally does not require any subsequent lubrication.

The adjustment crowns of the described type are used in addition to a head, or as a replacement for a head, for example for an inner or outer hexagon head of a bolt, double-ended bolt, eccentric bolt, a bush, eccentric bush or screw, or as an external design of a nut. This is also the case in particular within a hinge of the type presented herein.

The adjustment crown is advantageously disk-shaped or is formed similarly to a disk with a circular or polygonal periphery. A plurality of radial engagement openings are distributed over its periphery and are preferably distributed uniformly over the periphery.

It is particularly advantageous if the adjustment crown is provided with one or more markings so that the adjustment elements can be set precisely and the setting can be checked, noted and/or repeated. Such markings may be notches or colored symbols or the like. It is particularly advantageous if each engagement opening is provided with a marking, at best with a marking that identifies each engagement opening clearly, for example by means of letters or numbers.

Further embodiments of the hinge and of individual components thereof are described in the claims.

BRIEF DESCRIPTION OF DRAWINGS

The hinge according to the invention and individual components thereof will be described in greater detail hereinafter on the basis of an exemplary embodiment illustrated in the Figures. The illustrations are presented in a sketched manner, and different scales, not corresponding to reality, are shown for the purpose of improved perceptibility. The explanations are given purely by way of example and are in no way limiting. Purely schematically in the Figures.

DETAILED DESCRIPTION

Figure 1:
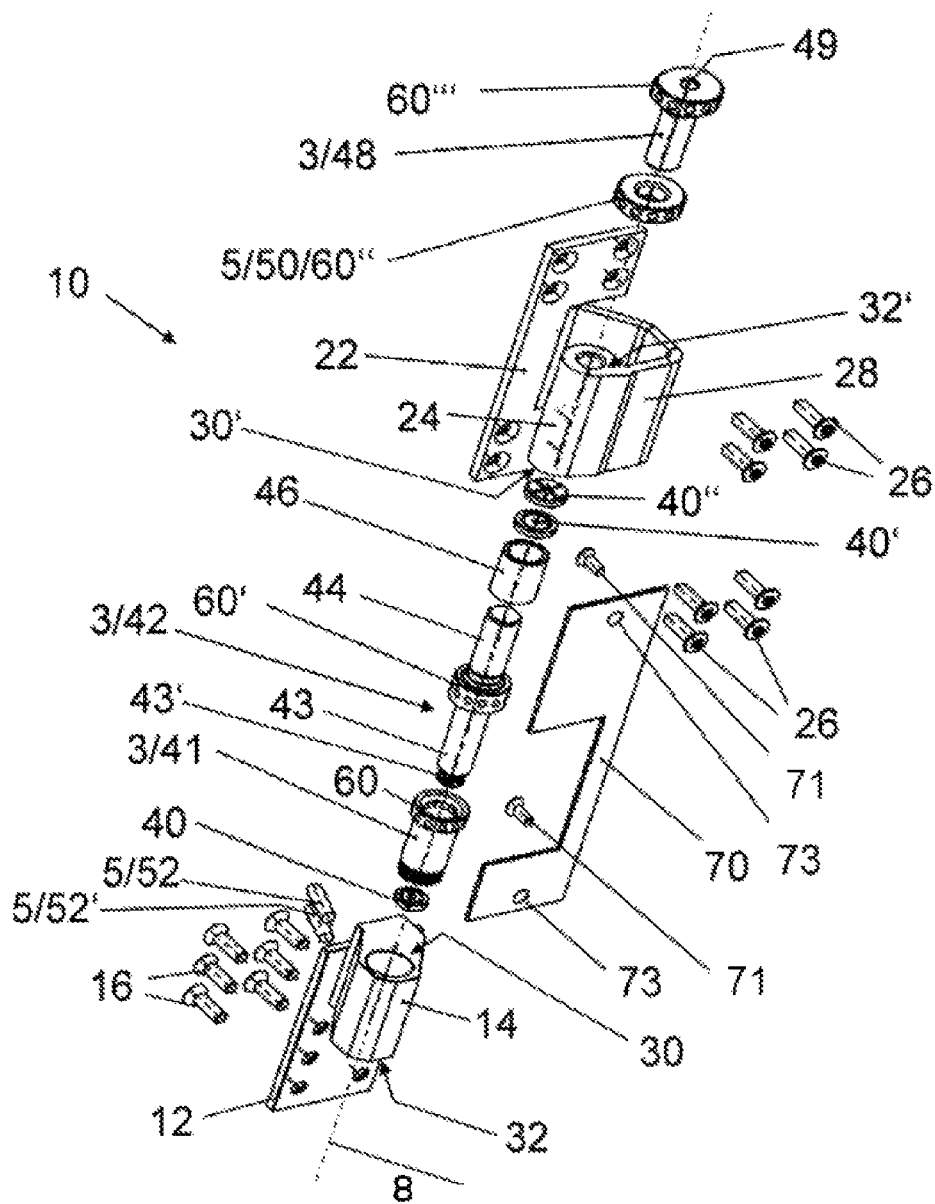
FIG. 1 shows an exploded view of a first embodiment of the hinge according to the invention.

With reference to FIGS. 1 to 9, a hinge 10 according to the invention and various components of the hinge 10 are illustrated in detail. Like components/elements are denoted by the same reference signs in the various figures. The hinge 10 is used to interconnect a first element 1 and a second element 2 (see FIGS. 6 and 7) in such a way that they can be pivoted against one another about a longitudinal axis of the hinge 10, wherein the hinge 10 is adjustable at least in two dimensions. In accordance with the invention, the hinge 10 is formed such that the main components of the hinge 10 are housed substantially in one of the two elements 1, 2 in the fitted state. The element 1, 2 may be provided, or is provided, with a corresponding recess 4 (see FIGS. 6 and 7) for this purpose. So that the hinge 10 is also adjustable in the fitted state, adjustment elements 3 and possibly also respective locking mechanisms 5 are provided with an adjustment crown 60, 60', 60", 60''' according to the invention.

Typical adjustment elements 3, which are provided with an adjustment crown 60, 60', 60", 60''', include bolts, double-ended bolts, eccentric bolts, bushes, eccentric bushes and screws. Typical locking mechanisms 5, which can be provided with an adjustment crown 60, 60', 60", 60''', include screws and check nuts. The adjustment crown is typically used in addition to, or even better instead of, a conventional inner or outer hexagon bolt head or screw head, or in addition to, or instead of, the outer design of a conventional hexagon nut.

The adjustment crown 60, 60', 60", 60''' is formed similarly to a disk with a circular or polygonal periphery and has a plurality of radial engagement openings 62 distributed over its periphery (see FIGS. 4 and 5), which are preferably distributed uniformly over the periphery. The engagement openings 62 can be formed for example as a hollow cylinder, inner hexagon/inner polygon or can be provided with an inner thread. A manipulation tool for the adjustment crown is formed as a pin or angled pin with a head formed accordingly in a diametrically opposed manner. If the engagement opening and the manipulation tool are designed in a particular manner (for example in the form of a thread having a specific pitch or in the form of a specific polygon), the use of the adjustment crown can thus also be provided for security against unauthorized adjustment.

Figure 5:
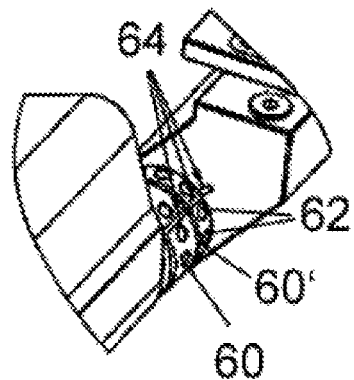
FIG. 5 shows a second embodiment of an adjustment crown in a perspective view.

The adjustment crown 60 is advantageously provided with one or more markings 64, which allows a repeatable setting of the adjustment elements 3 provided with the adjustment crowns 60, 60', 60'''. It is particularly advantageous if each engagement opening 62 has a marking 64. It is even better if each engagement opening 62 is clearly identifiable by means of the marking 64, since even fine adjustments can then be noted and set repeatably. Such a marking may consist in the indexing of the engagement openings by numbers or letters (see FIG. 4). Another type of marking consists, for example, in notches, which for example mark a starting position or a target position, as illustrated in FIG. 5.

The advantage of the described adjustment crowns 60, 60', 60", 60''' is their good accessibility for the operating tool and therefore their good adjustability, even when fitted in situations where space is very restricted. This means that, for applications in which space is very restricted when the hinge is fitted, but rotatability of a bolt, a bush, a screw or nut is to be ensured, a bolt, a bush, a screw or nut with a corresponding adjustment crown 60, 60', 60", 60''' can be used and the possibility for adjustment is ensured, in spite of the restricted space.

For the hinge 10 according to the invention, this means that, by use of adjustment elements 3 and possibly of locking mechanisms 5 with adjustment crowns 60, 60', 60", 60''', said hinge can be fitted into a recess 4 in one of the elements 1, 2 that it connects, and that it nevertheless remains adjustable.

To enable trouble-free pivoting of the elements 1, 2, it is advantageous if one of the two elements 1, 2 is connected via a curved flange 28 to an element 1 or 2 arranged in the longitudinal axis of the hinge 10. The curvature of the flange 28 is designed such that it is guided around the component in part. The free end of the hinge then lies outside the tangent in which the flange is arranged on the component.

A first example for a hinge 10 according to the invention adjustable in three directions is illustrated in FIGS. 1 to 3 and 5 and 6. This exemplary embodiment of the hinge 10 according to the invention is suitable for the interconnection of heavy elements and can thus be fitted, for example, in a recess 4 in a door, a door jamb or a window frame. The high forces that occur are taken up in this hinge by pressure disks 40, 40', 40" so that the elements 1, 2 can pivot easily against one another in spite of the weight of the heavy elements. This is particularly important in the case of safety doors. The pressure disks 40, 40', 40" are then particularly advantageously fabricated from bronze, in particular from self-lubricating bronze.

Hinges 10, which interconnect two light elements and with which the forces acting in the hinge are therefore not so strong, can also be designed without pressure disks. Such hinges 10 may be hinges that connect a door of a cupboard to its cupboard housing, for example.

Figure 2:
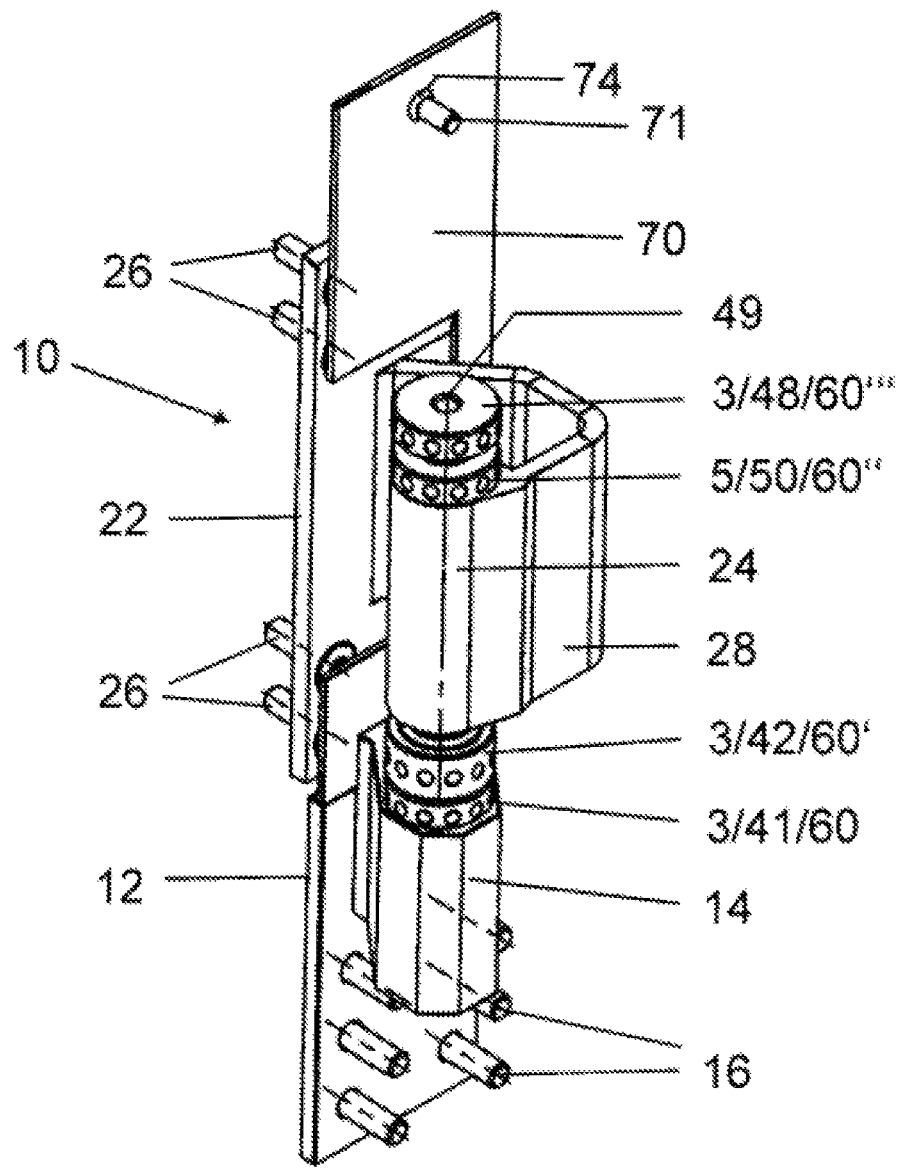
FIG. 2 shows a perspective view of the hinge from FIG. 1 in the assembled state.
Figure 3:
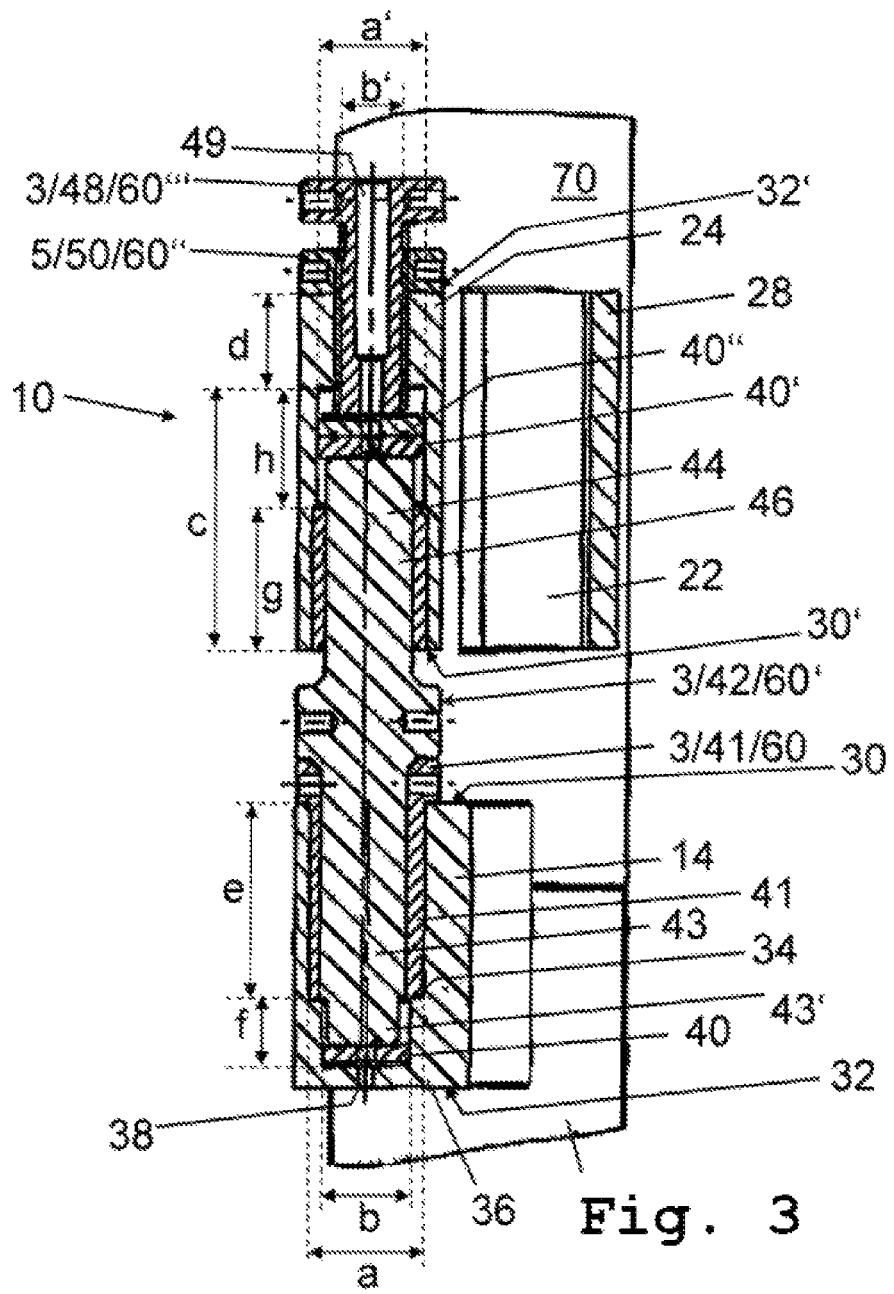
FIG. 3 shows the hinge from FIG. 2 in a sectional view taken along the longitudinal direction of the hinge.
Figure 4:
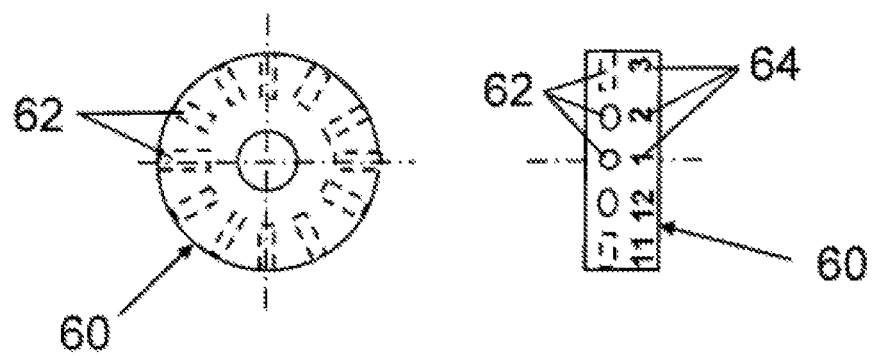
FIG. 4 shows a first embodiment of an adjustment crown, in a plan view and in a side view.

The hinge 10 according to the invention in FIGS. 1 to 3 has a first fastening plate 12 with a first bearing bush 14, which can be fastened to a first element 1 with the aid of fastening means 16. The hinge 10 further has a second fastening plate 22 with a second bearing bush 24, which is connectable to the second element 2 by means of fastening means 26 (see FIGS. 6 and 7). The fastening means 16, 26 are formed in this case as countersunk screws, and the fastening plates 12, 22 are designed to be attached and fixed externally to the elements 1, 2 respectively. Other known fastening means 16, 26, such as nails, bolts or clamps can also be used however, and one of the fastening plates 12, 22 may also be fixed to the element 1, 2 from the inside, that is to say for example from the side of the recess 4. Such variants do not change the underlying concept of the invention. The hinge 10 has two components 14, 24 that are mutually opposed in the longitudinal direction 8 and rotatable against one another, a first component is the first bearing bush 14 being connectable to the first element 1, and a second component is the second bearing bush 24 being connectable to the second element 2 via a free end of a curved flange 28, the curvature of the flange 28 guiding the free end of the flange 28 around the two components 14, 24 in part. The two components 14, 24 of the hinge 10 that are mutually opposed in the longitudinal direction 8 of the hinge 10 and are rotatable against one another are a first bearing bush 14 and a second bearing bush 24, and in that these are arranged by means of a double-ended bolt 42 so as to be mutually opposed in the longitudinal direction 8 of the hinge 10 and so as to be rotatable against one another.

The recess 4 may be closed by a cover plate 70 (see FIGS. 1, 2, 6 and 7 in particular) for optical reasons and to prevent soiling. Once the fastening plates 12, 22 have been fixed to the two elements 1, 2 and once the hinge 10 has been assembled by means of fastening means 71, the cover plate 70 is preferably connected to the element 1, 2 that has the recess 4. The cover plate may be connected directly to the element, or else indirectly via the bearing bush, which is fastened to the corresponding element. In the example shown in FIGS. 6 and 7, the cover plate is thus fastened to the element 1 or to the first bearing bush 14 via its first fastening plate 12.

Figure 6:
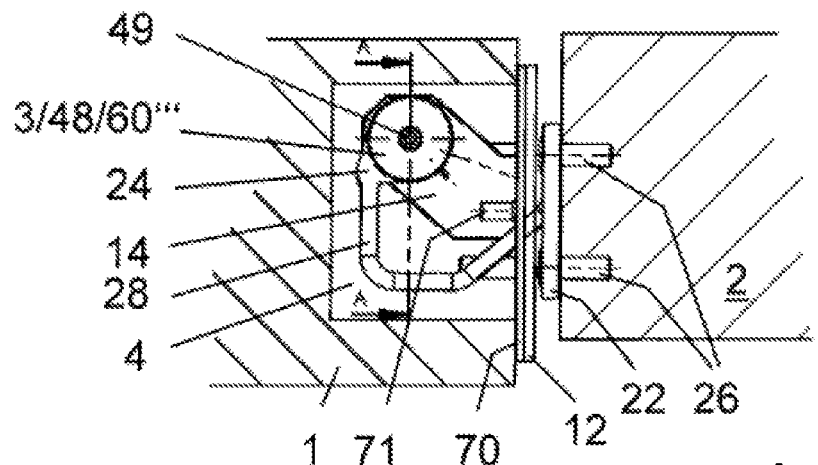
FIG. 6 shows a hinge according to the invention in a plan view in a first closed position interconnecting two elements.
Figure 7:
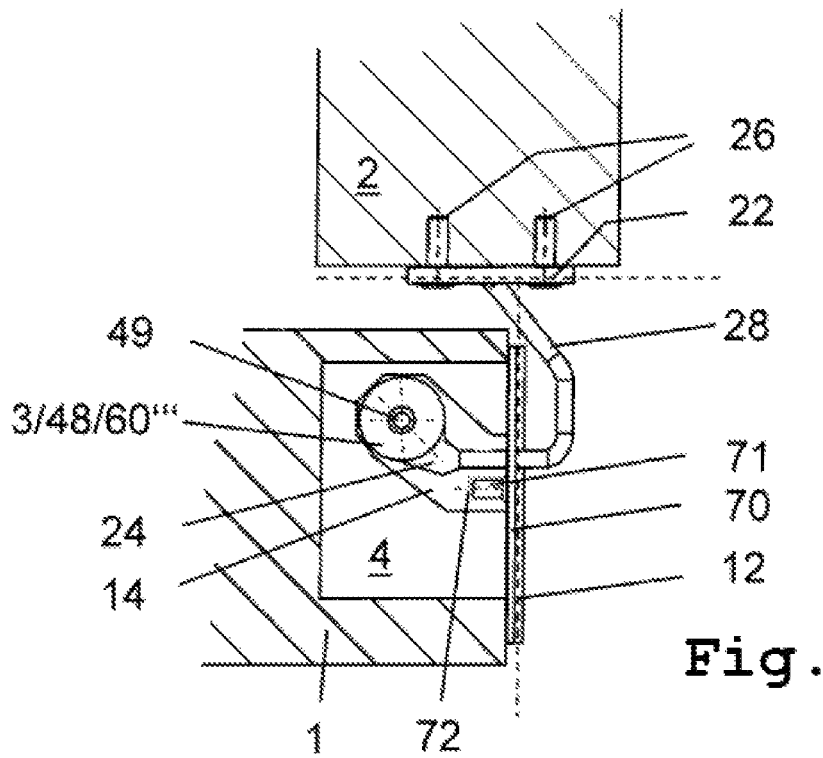
FIG. 7 shows the hinge from FIG. 6 in a second, not completely open, position.

Bolts or screws and in particular countersunk screws are preferably provided as fastening means 71. The element or the bearing bush or the fastening plate then have a corresponding fastening option 72, for example in the form of one or more receiving openings for fastening bolts or one or more threaded bores for receiving fastening screws (FIGS. 6 and 7). The cover plate 70 is provided accordingly with continuous openings 73, which can be aligned with the fastening options 72 in the element or in the bearing bush and its fastening plate.

If the cover plate 70 and, for example, the first fastening plate 12 are to form a plane, the inner end 30 of the first bearing bush 14 may thus protrude beyond the first fastening plate 12 of said bearing bush, as shown in the exemplary embodiment in FIGS. 1 to 3, and may have the fastening option 72 in this region protruding beyond the fastening plate 12 (FIG. 1). The cover plate 70 and the fastening plate 12 then preferably have the same thickness. This variant may be expedient for optical reasons, or else if the hinge 10 is to close very tightly, for example as in the case of fire doors.

The second bearing bush 24 is fixedly connected via a bent flange 28 to the second fastening plate 22. Instead of the bent or curved flange, a bent or curved connecting arm may also be provided, or a plurality of flanges or connecting arms may be provided. The curvature of the bent flange 28 is, in this case, selected such that, in a first closed position of the hinge, as illustrated in FIG. 6, the two fastening plates 12, 22 lie in one plane or in two parallel planes arranged very close together. "Very close together" means a distance between the planes of 0 mm (same plane) to 1 cm or 1.5 cm, depending on the material used (wood, steel, aluminum, plastic) and the requirements of the seal (seal material and thickness of the seal material used), and "parallel planes" means that deviations from absolute parallelity in the range of technical tolerances from 0° to 5° are included. Further, the curvature is selected such that, in a second, maximally open position of the hinge, the two fastening plates 12, 22 are arranged at an angle of approximately 90° to 110° to one another. By way of example, FIG. 7 shows an open position, although not a maximally open position, in which the two fastening plates 12, 22 are arranged at an angle of 90° to one another.

The first bearing bush 14 and the second bearing bush 24 are arranged so as to be mutually opposed in the longitudinal direction 8 of the hinge 10 once the hinge 10 is assembled (see FIG. 2), wherein the respective inner end 30, 30' of said bearing bushes faces the other bearing bush and their respective outer end 32, 32' faces away from the other bearing bush. The bearing bushes 14, 24 are each open at their inner end 30, 30' so as to receive further components of the hinge 10.

The first bearing bush 14 has a first inner diameter "a" over a portion e at its inner end 30 and has a second inner diameter b over a portion f at its outer end 32. The second inner diameter b is smaller than the first inner diameter "a" and is staggered therefrom by a shoulder 34. Apart from a small through-opening 38, the first bearing bush 14 is closed at its outer end 32 by a bush base 36 (see FIG. 3).

In the assembled hinge 10 (see FIGS. 1 and 3), a first pressure disk 40 is supported on the bush base 36 of the first bearing bush 14. The pressure disk 40 is likewise provided with a through-opening 39, which is aligned with the through-opening 38 in the bush base 36. The through-openings 38, 39 make it possible, when necessary, to introduce a lubricant.

An eccentric bush 41 is mounted slidingly rotatably on the shoulder 34 of the first bearing bush 14. The eccentric bush 41 protrudes beyond the inner end 30 of the first bearing bush 14 and is provided in this protruding region with an outwardly projecting first adjustment crown 60.

A double-ended bolt 42 is accommodated slidingly rotatably via its first bolt end 43 in the eccentric bush 41. At its free end, the first bolt end 43 has a portion 43' of smaller diameter, which, in the assembled state, reaches into the region e having the smaller second inner diameter b of the first bearing bush 14, where it is supported on the first pressure disk 40.

The double-ended bolt 42 is equipped approximately in its center with a swelling in the form of a second adjustment crown 60', from which a second bolt end 44 extends in the longitudinal direction in a direction opposite the first bolt end 43. In the assembled state, the second bolt end 44 is accommodated in the second bearing bush 24 such that, in the assembled hinge 10, the two bearing bushes 14, 24 are placed and held by means of the double-ended bolt 42 so as to be mutually opposed in the longitudinal direction 8 of the hinge 10. The second bolt end 44 is mounted slidingly rotatably in the second bearing bush 24.

At its inner end 30', the second bearing bush 24 has a first inner diameter a', which extends over a length c of the bearing bush 24. At its outer end 32', it has a second inner diameter b', which extends over a length d of the second bearing bush 24. The second inner diameter b' is smaller than the first inner diameter a' and is staggered therefrom by a shoulder 34'. The region d with the smaller inner diameter b' is formed as a through-opening and is therefore also accessible from the outer end 32' of the second bearing bush 24.

When assembling the hinge 10, a second and a third pressure disk 40', 40" are first inserted into the second bearing bush 24 from the inner end 30' thereof such that they are supported against the shoulder 34' of the second bearing bush 24. A bearing bush/pressing bush 46 is then pressed into the open inner end 30' of the second bearing bush. The bearing bush 46 is pressed in such that the two pressure disks 40', 40" are displaceable inside the bearing bush 24 in the longitudinal direction 8 of the hinge 10 between the bearing bush 46 and the shoulder 34' over a distance h.

As a result of the support against the shoulder 34' on the one hand and the bearing bush 46 on the other hand, the two pressure disks 40', 40" are secured from falling out once the bearing bush 46 has been pressed in. The pressed-in bearing bush 46 preferably has a longitudinal extension g that is shorter than the longitudinal extension c, over which the first inner diameter a' extends. It is even better if, as illustrated in FIG. 3, the longitudinal extension g of the pressed-in bearing bush 46 is dimensioned such that, together with the distance h, it gives the longitudinal extension c, over which the first inner diameter a' extends. It is thus possible to press the bearing bush 46 over its entire length g into the second bearing bush 46 so that, on the one hand, it does not protrude beyond the second bearing bush 24 at the inner end 30' and, on the other hand, the pressure disks 40', 40" are still displaceable inside over the distance h.

The second inner diameter b' of the second bearing bush 24 is equipped with an inner thread and is used to receive a set-screw 48, which is provided with an outer thread and which is screwed into the second bearing bush 24 from the outer end 32'. For security, a check nut 50 is screwed onto the set-screw 48 before the set-screw 48 is screwed into the second bearing bush 24. The check nut 50 is provided with a third adjustment crown 60", and the set-screw 48 is provided with a fourth adjustment crown 60'''.

The set-screw 48 has a central through-opening 49, which aligns with the through-openings 39 in the pressure disks 40', 40" such that, in this case too, lubrication is possible when necessary.

The pressure disks 40, 40', 40" are particularly advantageously fabricated from bronze, in particular from self-lubricating bronze.

Figure 8:
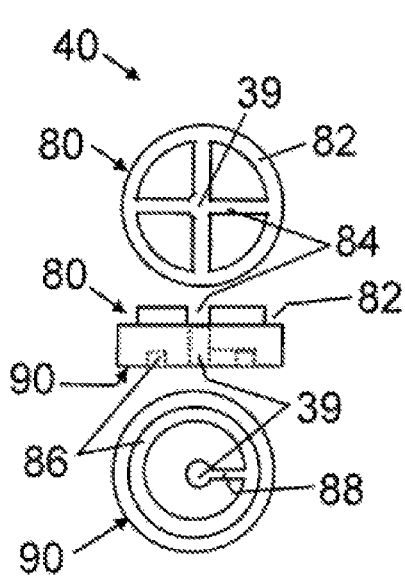
FIG. 8 shows a first embodiment of a pressure disk.
Figure 9:
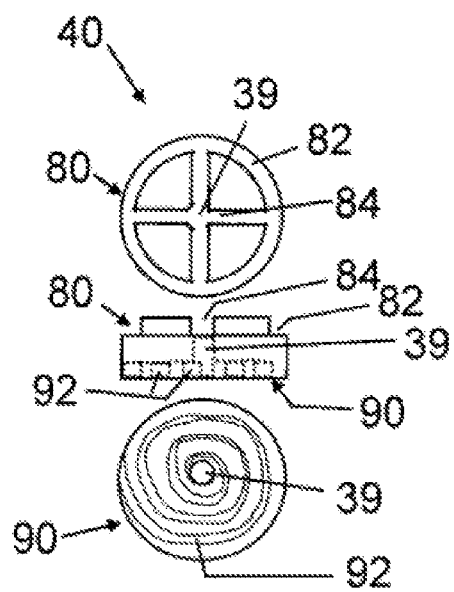
FIG. 9 shows a second embodiment of a pressure disk.

In a specific embodiment, the pressure disks 40, 40', 40" have a central through-opening 39, as is illustrated in detail in FIGS. 8 and 9. On a first side 80, they also have a cross-shaped groove 84, which connects the through-opening 39 to a peripheral groove 82. In the example shown in FIG. 8, the pressure disk further has a tapping groove 88 on its second side 90, said tapping groove connecting the through-opening 39 to a circular groove 86. Of course, it is also conceivable to connect the circular groove 86 to the through-opening 39 by means of the cross-shaped groove 84 and to connect the peripheral groove 82 to the through-opening 39 by means of the tapping groove 88, or to provide other groove forms for such a connection. A further variant is shown in FIG. 9, in which, on the second side 90 of the pressure disk 40, the through-opening 39 is connected to the periphery of the pressure disk 40 by means of a spiral groove 92. Of course, a channel system for the distribution of lubricant can also be provided just on one side, instead of on both sides 80, 90. With very heavy doors, or with high safety requirements, for example with fire doors, a double-sided distribution of lubrication via grooves is to be preferred however, since the lubrication can be ensured more reliably.

It has proven to be particularly advantageous to provide two pressure disks at locations which are particularly stressed by movement, and to align the two sides 90 of these pressure disks with one another, said sides being provided with a circular groove 86 and a tapping groove 88.

In the assembled state, the second bolt end 44 of the double-ended bolt 41 engages from the inner end 30' of the second bearing bush 24, through the pressing bush 46, into the second bearing bush 24, and presses against the pressure disks 40', 40".

As can be seen clearly in FIGS. 6 and 7, the main elements, namely the two bearing bushes 14, 24 and the double-ended bolt 42, are housed in the recess 4 in one of the elements in the fitted state. Only the free end of the curved flange 28 protrudes from the recess 4, and the flange 28 can be pivoted out from the recess 4 and back into the recess 4. If a cover plate 70 is provided, it is arranged and designed such that the flange also protrudes via its free end from an opening in the cover plate 70 and can be pivoted freely through this opening.

As can be seen clearly in FIG. 3, the length of the set-screw 48 is greater than the length d over which the second inner diameter b' extends, and therefore the set-screw 48 bears down on the pressure disks 40', 40". By turning the set-screw 48, the pressure disks 40', 40" are displaced along the distance h, whereby the distance between the two bearing bushes is changed. A first possibility for adjustment, namely a lateral displacement of the two elements 1, 2 against one another in the direction of the longitudinal direction 8 of the hinge 10, can thus be achieved. If the hinge 10 is fitted between two elements 1, 2 in such a way that its longitudinal direction 8 extends vertically (for example in doors), this corresponds to a possibility for vertical adjustment over the distance h.

As normal, the wall thickness of the eccentric bush 41 changes in the peripheral direction due to the eccentric arrangement of its hollow cylinder (see FIG. 3). By turning the eccentric bush 41, a lateral displacement of the two elements 1, 2 against one another can thus be achieved perpendicular to the longitudinal direction 8 of the hinge 10. Together with the possibility for adjustment in the longitudinal direction of the hinge 10, a hinge 10 that is adjustable in two dimensions is thus obtained. The setting of the elements 1, 2 relative to one another achieved by turning the eccentric bush can be fixed by means of a locking mechanism 52, which is formed as a worm screw in the example shown in the figures. The bearing bush has a corresponding continuous threaded opening so as to receive the worm screw (not illustrated). To fix the setting, the worm screw 52 is tightened firmly so that it is brought inside the bearing bush into operative connection, with a non-positive fit, with the eccentric bush 41.

In a specific embodiment of the eccentric bush, said bush may have a knurling in the region of the cooperation with the worm screw 52, or a surface that has been roughened by scrubbing, filing, grinding, etching or a similar method.

In a specific embodiment of the hinge 10, as illustrated in FIGS. 1 to 3, the double-ended bolt 42 is formed as an eccentric bolt. One bolt end is arranged centrally with respect to the central swelling provided by the second adjustment crown 60', whereas the other bolt end is arranged eccentrically relative to the second adjustment crown 60' and the other bolt end. In this case it is irrelevant whether the first bolt end 43, which is accommodated in the eccentric bush 41 of the first bearing bush 14, or the second bolt end 44, which is mounted in the second bearing bush 24, is arranged eccentrically. If the hinge 10 has such an eccentric bolt as a double-ended bolt 42, the two elements 1, 2 can thus additionally be displaced laterally against one another in a second direction extending perpendicular to the longitudinal direction 8 of the hinge 10 by turning the eccentric bolt, whereby the possibility for three-dimensional adjustment of the hinge 10 and of the two elements 1, 2 against one another is provided.

The setting of the elements 1, 2 relative to one another achieved by turning the eccentric bolt can be fixed by a locking mechanism 52', which is likewise formed as a worm screw 52' in the example shown in the figures. The bearing bush has a corresponding continuous threaded opening so as to receive the worm screw (not illustrated). To fix the setting, the worm screw 52' is tightened firmly so that it is brought inside the bearing bush into operative connection, with a non-positive fit, with the eccentric bolt. In the embodiment shown in the figures, the worm screw cooperates in a fixing manner with the eccentric bolt 42 in the end region 43' of the first bolt end 43. Another option would be, for example, to provide the eccentric bush with one or more slits extending in the peripheral direction, through which the worm screw 52 can be engaged, with a non-positive fit, with the eccentric bolt 42.

In a specific embodiment, the eccentric bolt can be provided with a rough surface in the region in which it cooperates with the locking mechanism. This surface can be produced by etching or grinding or scrubbing or knurling or similar methods.

In another embodiment, a hinge that is adjustable in two dimensions is produced by using a normal bush, for example likewise a pressing bush, instead of the eccentric bush 41 and by using a double-ended bolt 42 in the form of an eccentric bolt as described above.

In a further embodiment, the possibility for adjustment in three dimensions is achieved by arranging both bolt ends 43, 44 of the double-ended bolt 41 eccentrically with respect to the adjustment crown 60' located therebetween, more specifically offset by approximately 90° to one another and offset from the center approximately by the same distance. It is thus possible to dispense with the eccentric bush in the hinge 10.

In contrast to that shown in the figures, it is of course also possible to achieve the possibility for eccentric adjustment and the possibility for adjustment in the longitudinal direction 8 of the hinge 10 on the same side of the hinge 10, that is to say in the region of the same bearing bush 14, 24. In this case, it is irrelevant whether this is achieved in the region of the first bearing bush 14 or in the region of the second bearing bush 24, which is connected to its second fastening plate 22 by the curved flange 28. Contrary to the example shown, the possibility for adjustment in the longitudinal direction 8 can also be achieved in the region of the first bearing bush 14, and the possibility for eccentric adjustment can be achieved in the region of the second bearing bush 24.

For light elements 1, 2, the hinge can also be formed without pressure disks 40, as described, and the bearing bushes (41, 46) can also be omitted. The hinge according to the invention may then have, for the possibility of adjustment in two dimensions, the two bearing bushes 14, 24 and the double-ended bolt 42 formed as an eccentric bolt, or else a bearing bush with an adjustable eccentric bush and a normal double-ended bolt. The latter variant with an eccentric bolt as the double-ended bolt again provides the possibility for adjustment in three dimensions, wherein the possibility for adjustment in the longitudinal direction of the hinge is achieved by means of a set-screw, as before. Of course, the variant with the doubly eccentric double-ended bolt is also conceivable in this instance. For a hinge that is only adjustable in two directions, a simpler design with just a simple bolt that is connected to a fastening plate (without a bearing bush therebetween) is also conceivable. The bolt is then mounted in an adjustable eccentric bush in a bearing bush, and the curved flange 28 is then connected either to the bearing bush or to the bolt.

A person skilled in the art will clearly know that the described embodiments and the details described on the basis of the exemplary embodiments can be combined as expedient, and will know how this is to be achieved. For reasons of space, it is not possible however to illustrate all possible and expedient combinations in detail in figures and/or to describe these combinations.

What is claimed is:

1. An adjustable hinge for pivotably connecting a first element to a second element, the hinge comprising:
    a bolt;
    first and second bearing bushes for receiving the bolt, the longitudinal direction of the hinge being defined by the bearing bushes and bolt, the first and second bearing bushes being two components that are mutually opposed in the longitudinal direction and rotatable against one another, a first component of the two components being connectable to the first element, and a second component of the two components being connectable to the second element via curved flange, the curved flange having a first end connected to the second component and a second end connected to the second element, wherein the curvature of the flange guides the second end of the flange partly around the second component;
    adjustment elements each being operably coupled with the bolt and first and second bearing bushes, including:
        a first adjustment element formed eccentrically and is used to provide the possibility for lateral displacement of the first and second elements against one another perpendicular to the longitudinal direction of the hinge; and
        a second adjustment element is used to provide the possibility for displacement of the first and second elements against one another in the longitudinal direction of the hinge,
    wherein:
        each of the adjustment elements has an independent adjustment crown connected thereto; and
        each of the adjustment crowns is designed similarly to a disk with a circular or polygonal periphery and has a plurality of radial engagement openings distributed over its periphery,
        wherein the adjustment element for providing the possibility for adjustment in the longitudinal direction of the hinges is designed as a set-screw that is provided with a fourth adjustment crown, and the set screw being provided with a check nut locking mechanism having a third adjustment crown, the check nut being screwed onto the set-screw.

2. A hinge according to claim 1, wherein at least one of the adjustment elements is provided with at least one locking mechanism operably coupled thereto.

3. A hinge according to claim 2, wherein at least one locking mechanism has a separate additional adjustment crown connected thereto.

4. A hinge according to claim 1, wherein at least one of the adjustment crowns is provided with one or more markings with which it is clearly identifiable.

5. A hinge according to claim 4, wherein each radial engagement opening is provided with a marking, the radial engagement openings being distributed uniformly over the periphery of the at least one of the adjustment crowns.

6. Hinge according to claim 1, wherein at least one of the adjustment crowns is arranged in the hinge in such a way that the radial engagement openings are oriented perpendicular to the longitudinal direction of the hinge.

7. A hinge according to claim 1, wherein when assembled the hinge is placed, at least via the two components of the hinge that are mutually opposed in the longitudinal direction of the hinge and rotatable against one another, within a recess in one of the elements, and only the second end of the curved flange protrudes from the recess, and the flange can be pivoted out from the recess and into the recess, the recess preferably being closable by a cover plate mounted to the first and second elements in such a way that the projection region of at least one of the two components that are mutually opposed in the longitudinal direction and rotatable against one another is covered, at least in part, the function of the flange still being maintained.

8. A hinge according to claim 1, wherein:
    the two components of the hinge that are mutually opposed in the longitudinal direction of the hinge and rotatable against one another are connectable to the first and second elements by means of two fastening plates, a first fastening plate being arranged at the second end of the curved flange, and
    the curvature is selected so that, in a first closed position of the hinge, the two fastening plates lie in one plane or in two parallel planes arranged close together and, in a second, maximally open position of the hinge, the two fastening plates are arranged at an angle of approximately 90° to 110° to one another.

9. A hinge according to claim 1, wherein the two components of the hinge that are mutually opposed in the longitudinal direction of the hinge and rotatable against one another are the first bearing bush and the second bearing bush, arranged by means of the bolt being a double-ended bolt so as to be mutually opposed in the longitudinal direction of the hinge and so as to be rotatable against one another.

10. A hinge according to claim 9, wherein the double-ended bolt is an eccentric bolt and has a second adjustment crown between its two bolt ends, at least one bolt end being arranged eccentrically in relation to the second adjustment crown.

11. A hinge according to claim 9, wherein an eccentric bush, which has a first adjustment crown, is mounted at least in one of the two bearing bushes.

12. A hinge according to claim 1, wherein forces acting in the longitudinal direction of the hinge are conveyed between the bolt and at least one of the bearing bushes via a pressure disk that is operably coupled with the bolt and the at least one of the bearing bushes.

13. A hinge according to claim 12, wherein the pressure disk has a central through-opening and a cross-shaped groove or a tapping groove at least on one side, said groove connecting the through-opening to a circular groove and/or to a peripheral groove.

14. A hinge according to claim 1, the hinge comprising:
the two bearing bushes, wherein each receives a bolt end of a double-ended bolt.

15. A hinge according to claim 1, wherein forces acting in the longitudinal direction of the hinge are conveyed between the bolt and the bearing bush via a pressure disk, the bearing bushes each have a through-opening, via which lubricant can be introduced.

16. A hinge according to claim 15, wherein the pressure disk has a central through-opening and a cross-shaped groove or a tapping groove at least on one side, said groove connecting the through-opening to a circular groove and/or to a peripheral groove, the through-opening in the bearing bushes being arranged so as to be aligned with the through-opening in the pressure disk.

* * * * *